United States Patent Office 3,185,706
Patented May 25, 1965

3,185,706
METHOD FOR PREPARING ALKALI METAL PYRROLIDONES
Thomas D. Mutaffis, North Plainfield, N.J., and Frank Carluccio and Max E. Chiddix, Easton, Pa., assignors to General Aniline & Film Corporation, New York, N.Y., a corporation of Delaware
No Drawing. Filed Apr. 3, 1963, Ser. No. 270,177
11 Claims. (Cl. 260—326.5)

This invention relates to an improved process for preparing an alkali metal pyrrolidone.

Polypyrrolidone is characterized by properties which make it extremely attractive commercially in the production of fibers, films, coatings, and the like. Accordingly, attempts have been made in the art to advance the technology in preparing polypyrrolidones to commercially economic levels. At present, one of the more suitable techniques for preparing such polymers involves the utilization of an alkali metal pyrrolidone as a catalyst. While the performance of these catalysts in pure form in the polymerization of polypyrrolidone is satisfactory, attempts to prepare such catalysts economically in the desired form and yields have not proven to be successful.

Generally, the alkali metal pyrrolidones are prepared by heating pyrrolidone batch-wise in the presense of an alkali metal hydroxide, carbonate, and the like. Alkali metal pyrrolidones, however, undesirably degrade at appreciably high rates at the temperatures empolyed in such preparations and it has been necessary to provide means, with the attendant increased equipment and operating expenditures, for rapidly heating and cooling of the batch to minimize degradation problems. While batches yielding suitable alkali metal pyrrolidones of about 85% purity have been successfully reacted on a laboratory scale, the cost involved in prior techniques in handling batches corresponding to those employed in commercial scale operations has been substantially commercially prohibitive. More importantly, attempts to scale-up batch processes to commercial quantities produce poor quality alkali metal pyrrolidones of about 20–50% purity which when employed in polypyrrolidone preparations yield polymers having color, viscosity, thermal stability, and tensile strength characteristics which do not meet the desired quality requirements.

Accordingly, it is the primary object of the present invention to provide a process for preparing alkali metal pyrrolidones which is more efficient and economical than processes heretofore available.

It is an additional object of the present invention to provide a method for preparing alkali metal pyrrolidones which is relatively simpler and entails equipment and operating expenditures which are appreciably less than those attendant syntheses heretofore available.

It is an additional object of the present invention to provide a process for preparing alkali metal pyrrolidones wherein the necessity of handling large batches of reactants simultaneously with the attendant problems with respect to final product degradation is eliminated.

It is yet a further object of the present invention to provide a method for preparing alkali metal pyrrolidones which when employed as catalysts in the polymerization of pyrrolidone yield polymers having color, viscosity, thermal stability and tensile strength characteristics appreciably superior to those of polymers obtained from alkali metal pyrrolidones produced in commercial scale quantities by techniques heretofore available.

Other objects of the present invention will be apparent to those skilled in the art from the description of the present method set forth hereinbelow.

Broadly described, the present invention provides a method for preparing an alkali metal pyrrolidone which comprises passing pyrrolidone in the form of a film through a reaction zone maintained at temperature and pressure conditions above the dew point of water, contacting said pyrrolidone in said reaction zone with an alkali metal base selected from the group consisting of the hydroxides, carbonates, and mixtures thereof at a temperature in the range of from about 170° to 250° C. whereby alkali metal pyrrolidone and water are formed, said alkali metal pyrrolidone remaining in said film and said water being converted to vapor and passing from said film, continuously removing said water vapor from said reaction zone, and recovering substantially undegraded alkali metal pyrrolidone from said reaction zone.

In accodrance with the present method, alkali metal pyrrolidones may be produced which are substantially free of contaminating degradation products, being characterized by purities above about 85% and ranging up to about 99%. Moreover, by means of the present method, alkali metal pyrrolidones having acceptable quality as polymerization catalysts for pyrrolidone may be produced in yields which are appreciably higher than those possible with techniques heretofore available. The present method has the further advantage, as compared to known techniques, for producing alkali metal pyrrolidones in that it simply and efficiently may be carried out in an operation wherein the requisite investment and operating expenditures are commercially feasible.

The present invention is based upon a discovery that the water, formed as a by-product in the reaction between pyrrolidone and the alkali metal base providing the alkali metal pyrrolidone, undesirably catalyzes a side reaction between the alkali metal base and pyrrolidone which yields the alkali metal salt of γ-aminobutyric acid. In the present method, the water formed as a by-product is removed from the reaction mixture as it is formed, and the undesirable effects of the water by-product on the quality and yields of the alkali metal pyrrolidone product is appreciably minimized.

The alkali metal bases contemplated for use in the present method suitably may be employed in any convenient form. The alkali metal base may be introduced into the system in the form of a solid or as a solution or a dispersion in a solvent which preferably is inert and/ or does not interfere with the reaction. In the preferred embodiments of the present invention, the alkali metal base is introduced as a solution in a solvent which is readily removed by vaporization at the indicated reaction conditions. Such solvents are referred to hereinafter in the specification and claims as "vaporizable solvents." Suitable solvents include alcohols such as methanol, ethanol, propanol, butanol, and the like; ethers such as diethylether, methylethylether, ethylpropylether, and the like; ketones such as acetone, methylethylketone, ethylpropylketone, and the like; and hydrocarbons such as naphthas, isoparafinic hydrocarbon mixtures, benzene, toluene, and the like. Although the invention also contemplates the utilization of aqueous solutions of the alkali metal bases, such solutions usually are not preferred. The use of water as the solvent in the proposed method, however, does improve the economy of the process and does provide significantly improved results as compared to results obtained in the batch technique heretofore available. Further embodiments involve the use of pyrrolidone itself as a solvent for the alkali metal base.

The alkali metal base may be introduced into the pyrrolidone feed to the reaction zone or may be introduced as a separate feed simultaneously with or subsequent to the pyrrolidone charge to the reaction zone. Preferably, a feed stream to the reaction zone is used comprising a mixture of pyrrolidone and the alkali metal base.

The amount of the alkali metal base employed in the present invention usually is such that the mole ratio of pyrrolidone to alkali metal base is in the range of from about 1:1 to about 100:1, although both higher and lower amounts of alkali metal base suitably may be employed. Preferably, the amount of alkali metal base employed provides a mole ratio of pyrrolidone to alkali metal base in the range of about 10:1 to about 50:1 to prepare pyrrolidone containing the alkali metal pyrrolidone catalyst in amounts requisite for subsequent polymerizations thereof.

In accordance with the method of the present invention, the pyrrolidone is formed into a film by any suitable means and the film is passed through the reaction zone wherein it is contacted with the alkali metal base to provide alkali metal pyrrolidone. The term "film" as used herein in the specification and claims is intended to refer to forms of pyrrolidone having a high surface area to volume ratio and which allows corresponding high heat transfer rates to be utilized in the reaction. Such forms also allow the desired primary reaction to be carried out over relatively short reaction zone resident times of from about 5 seconds to about 10 minutes which are advantageous in economically providing the desired products having low levels of contamination. Specific examples of forms of the pyrrolidone "films" employed in accordance with the invention include, without limitation, films formed in the operation of apparatus conventionally known as turbafilm or wipe film evaporators, films formed by trickling pyrrolidone through packed columns at rates lower than saturation feeds, droplet films formed by spraying pyrrolidone into conventional spray towers, and films formed in conventional falling film towers.

The preferred embodiments of the present method are carried out utilizing films of the type formed in apparatus of the turbafilm or wipe film evaporator type. Suitable examples of such apparatus are shown, inter alia, in U.S. Patents Nos. 2,596,086, 2,774,415, and 2,868,279. In such apparatus the thickness of the film is determined by the wall clearance of the rotor therein.

Although films having a greater thickness suitably may be employed, the preferred embodiments of the present method are carried out utilizing films having a thickness ranging up to about 0.5 inch, and more preferably in the range of from about 0.05 to about 0.3 inch.

In the method of the instant invention, pressures suitably may be employed which, at the temperatures employed of about 170° to about 250° C., maintain the conditions in the reaction zone above the dew point of water. Usually, in order to facilitate the separation of water from the pyrrolidone in the film, sub-atmospheric pressures are employed. More preferred embodiments of the method utilize pressures in the range of from about 5 to about 50 mm. Hg.

The water vapor formed in accordance with the present method continuously is removed from the reaction zone. Removal of the vapor suitably may be carried out by any conventional means. Preferably the water vapor removal is accomplished by the utilization of a heated "sweep" stream of gas which is inert and/or does not interfere with desired reaction such as nitrogen, carbon dioxide, air, methane, pyrrolidone vapor, and the like. The rate of introduction of the sweep stream employed varies depending upon the particular circumstances of a given instance and easily may be determined by routine experiment. In the more preferred embodiments of the method of the invention, a combination of sub-atmospheric pressures and a gaseous sweep stream through the reaction zone are employed.

The method of the invention having been broadly described, the following examples are given to show specific embodiments thereof. It will be understood that the examples are given for illustration purposes and not by way of limitation.

*Example I*

A mixture consisting of about 906 grams of pyrrolidone and 123 grams of a 26% by weight potassium hydroxide methanol solution was introduced into the top of a glass wiped film unit consisting of two 2-inch by 14-inch units connected in a series and being adjusted at rotor speeds of about 450-500 r.p.m. at wall clearances of about 0.1 inch. The total feed of the pyrrolidone-potassium hydroxide mixture was about 3900 grams per hour. The units were provided with electrically heated jackets which maintained the units at about 230° C. The pressure in the system was maintained under a partial vacuum of about 20 to 28 mm. of mercury A nitrogen stream of about 0.5 cubic foot per hour was passed through the units to sweep vapors therefrom. Vapor containing methanol, water, pyrrolidone, and nitrogen was collected overhead and passed through a series of condensers consisting of initial hot water condensers wherein pyrrolidone vapors were selectively condensed and subsequently through a Dry Ice condenser wherein water and methanol vapors were condensed. The pyrrolidone recovered in the hot water condenser was recycled to the units in the feed stream. About 3900 grams were recovered from the bottom of the second unit and consisted of a pyrrolidone solution of potassium pyrrolidone having a concentration of about 5% by weight. The purity of the potassium pyrrolidone in the product solution was determined to be about 96% by titration. Either the catalyst solution or the solid recovered by evaporation is useful in the polymerization of pyrrolidone.

Polypyrrolidone prepared using the potassium pyrrolidone product as a catalyst in accordance with the method disclosed in application Serial No. 173,822, filed February 16, 1962, yielded a polymer having excellent viscosity, color, thermal stability, and tensile strength chractenstics.

*Example II*

In order to demonstrate the effectiveness of the utilization of packed towers as the reaction zone in accordance with the present method, a feed of the composition described in Example I was passed at a rate of about 1200 grams per hour into the top of a packed column having a diameter of about 1.75 inches and a length of about 20 inches and containing 5 to 7 mm. glass rings as the packing. The column was jacketed with an electric heater which was adjusted to maintain the temperature of the column at about 200° C. The column was maintained under a partial vacuum in the range of from about 8 to about 30 mm. of mercury. Pyrrolidone vapor was passed upwardly through the column to strip methanol and water from the liquid passing downwardly therethrough. Methanol, water and pyrrolidone were recovered from the vapor passing overhead from the column in accordance with the procedure of Example I. About 1800 grams of a 5% by weight potassium pyrrolidone (about 90% pure) solution in pyrrolidone was recovered from the bottom of the column.

Polypyrrolidone prepared directly from the potassium pyrrolidone-containing pyrrolidone was of exceptional quality.

Although further embodiments of the method of the invention will be apparent to one skilled in the art from the description and specific embodiment thereof given above, it will be understood that it is intended that the present invention be limited only by the scope of the appended claims.

What is claimed is:

1. A method for preparing an alkali metal pyrrolidone which comprises passing pyrrolidone in the form of a film through a reaction zone maintained at temperature and pressure conditions above the dew point of water, contacting said pyrrolidone in said reaction zone with an alkali metal base selected from the group consisting of the hydroxides, carbonates, and mixtures thereof at a temperature in the range of from about 170° to about 250° C. whereby alkali metal pyrrolidone and water are formed, said alkali metal pyrrolidone remaining in said film and said water being converted to vapor and passing from said film, continuously removing said water vapor from said reaction zone, and recovering substantially undegraded alkali metal pyrrolidone from said reaction zone.

2. The method according to claim 1 wherein a stream of an inert gas is passed through said reaction zone to aid in the removal of said water vapor from said reaction zone.

3. The method according to claim 2 wherein said gas is nitrogen.

4. The method according to claim 1 wherein said reaction zone is maintained at sub-atmospheric pressures in the range of from 5 to about 50 mm. of mercury.

5. The method according to claim 1 wherein said alkali metal base is introduced into said reaction zone in the form of a solution in a vaporizable solvent.

6. The method according to claim 5 wherein said vaporizable solvent is a lower alkanol.

7. The method according to claim 5 wherein said vaporizable solvent is water.

8. The method according to claim 1 wherein the mole ratio of said pyrrolidone to said alkali metal base is in the range of from about 1:1 to about 100:1.

9. The method according to claim 1 wherein said alkali metal base is an alkali metal hydroxide.

10. The method according to claim 1 wherein said alkali metal base is an alkali metal carbonate.

11. The method according to claim 1 wherein the thickness of said film ranges up to about 0.5 inch.

No references cited.

IRVING MARCUS, *Primary Examiner.*
NICHOLAS S. RIZZO, *Examiner.*